No. 676,240.  
S. D. LATTY.  
BOLT.  
(Application filed Feb. 24, 1900.)
(No Model.)
Patented June 11, 1901.
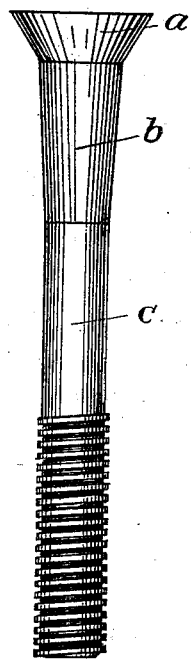
Witnesses,  
J. C. Turner  
N. E. Merkel
Inventor,  
S. D. Latty  
By J. D. Fay  
Atty.

UNITED STATES PATENT OFFICE.

SAMUEL D. LATTY, OF CLEVELAND, OHIO, ASSIGNOR OF ONE-HALF TO HENRY T. LATTY, OF SAME PLACE.

BOLT.

SPECIFICATION forming part of Letters Patent No. 676,240, dated June 11, 1901.

Application filed February 24, 1900. Serial No. 6,336. (No model.)

*To all whom it may concern:*

Be it known that I, SAMUEL D. LATTY, a citizen of the United States, and a resident of Cleveland, county of Cuyahoga, and State of Ohio, have invented a new and useful Improvement in Bolts, of which the following is a specification, the principle of the invention being herein explained and the best mode in which I have contemplated applying that principle, so as to distinguish it from other inventions.

My invention relates to bolts, and particularly to what are generally known as "tire-bolts," and to that class of tire-bolts which have their threads rolled upon them, whereby the outer thread diameter is caused to be greater than the diameter of the bolt-body intermediate of said thread and the bolt-head. Such difference in diameter makes it necessary to bore a hole in the tire of sufficient diameter to admit of the ready insertion of the threaded bolt portion, and hence unless other provision were made the bolt-body would lie loosely in said hole instead of forming a snug fit, as is required. Such provision my invention supplies.

The annexed drawing represents an enlarged side elevation of a tire-bolt embodying my invention.

The wire or rod from which the bolt is constructed after having been subjected to the rolling process, whereby one end is provided with a thread, such thread being as a result of such process of greater outer diameter than the remaining or body portion of the rod, is placed in suitable dies and upset to form a head $a$ and a portion $b$, having a conical surface intermediate of said head and thread, the greatest diameter of which is located nearest the head $a$, as shown, such diameter being made greater than the outer thread diameter, and hence necessarily greater than the diameter of the body portion $c$. It is thus seen that the above-described construction permits the hole in the tire in which it is inserted to be of less diameter than the conical portion and of sufficiently large diameter to permit of the ready insertion of the threaded portion without injury thereto, thereby permitting the bolt to be tightly drawn and wedged into the tire and so become securely seated and fastened therein.

Having described my invention, I particularly point out and distinctly claim—

A tire-bolt formed with a threaded portion of greater diameter than the body portion, and having a conical-surfaced portion intermediate said body portion and the bolt-head and having its greatest diameter in juxtaposition to the bolt-head, a portion of said conical-shaped part being of greater diameter than the threaded portion, whereby said threaded portion may be passed freely through an opening in the tire, and there may be secured a frictional binding of the conical-surfaced portion with the walls of the opening to retain the bolt wedged thereon, substantially as described.

Signed by me this 21st day of February, 1900.

S. D. LATTY.

Attest:
D. T. DAVIES,
A. E. MERKEL.